United States Patent [19]

Porter et al.

[11] Patent Number: 5,203,305
[45] Date of Patent: Apr. 20, 1993

[54] APPARATUS AND METHODS FOR CONVERTING CONVENTIONALLY FUELED ENGINES TO OPERATE ON AN ALTERNATIVE FUEL

[76] Inventors: Fred C. Porter, 447 E. Elmwood; Garth J. Schultz, 2111 Lovington Ave., Apt. #106, both of Troy, Mich. 48083

[21] Appl. No.: 903,920

[22] Filed: Jun. 25, 1992

Related U.S. Application Data

[63] Continuation-in-part of Ser. No. 758,894, Sep. 11, 1991, Pat. No. 5,150,685.

[51] Int. Cl.[5] .................... F02D 41/04; F02M 21/02
[52] U.S. Cl. ............................... 123/478; 123/527; 123/575
[58] Field of Search ............ 123/1 A, 478, 480, 494, 123/381, 525, 527, 575, 472

[56] References Cited

U.S. PATENT DOCUMENTS

| | | | |
|---|---|---|---|
| 4,112,875 | 9/1978 | Laumann et al. | 123/1 A |
| 4,181,100 | 1/1980 | Yamane et al. | 123/431 |
| 4,495,930 | 1/1985 | Nakajima | 123/575 |
| 4,531,497 | 7/1985 | Smith | 123/525 |
| 4,537,172 | 8/1985 | Kanehara et al. | 123/478 X |
| 4,553,504 | 11/1985 | Duggal et al. | 123/25 J |
| 4,617,904 | 10/1986 | Pagdin | 123/527 X |
| 4,632,083 | 12/1986 | Reggiani | 123/527 |
| 4,635,608 | 1/1987 | Carroll | 123/557 |
| 4,711,223 | 12/1987 | Carroll | 123/557 |
| 4,865,001 | 9/1989 | Jensen | 123/525 |
| 4,876,988 | 10/1989 | Paul et al. | 123/1 A |
| 4,889,097 | 12/1989 | Bevill et al. | 123/478 |
| 4,922,862 | 5/1990 | Casacci | 123/1 A |
| 4,955,345 | 9/1990 | Brown et al. | 123/478 X |
| 4,989,570 | 2/1991 | Kuribara et al. | 123/494 |
| 4,995,367 | 2/1991 | Yamauchi et al. | 123/494 |
| 5,003,956 | 4/1991 | Iwamoto et al. | 123/494 |
| 5,092,305 | 3/1992 | King | 123/575 |
| 5,150,690 | 9/1992 | Carter et al. | 123/478 X |

*Primary Examiner*—Willis R. Wolfe
*Attorney, Agent, or Firm*—Brooks & Kushman

[57] ABSTRACT

An apparatus and methods for converting fuel injected internal combustion engines normally operated with a conventional fuel such as gasoline to operate with an alternative fuel are disclosed. The methods include a synchronization method where an alternative fuel injector control signal is synchronized among two or more alternative fuel injectors throughout the engine's energy demand range; a method for transforming non-sequential conventional fuel injector control signals to individual cylinder timed alternative fuel injector control signals; a method for transforming sequential multiport conventional fuel injector control signals to throttle body alternative fuel injector control signals; and a method which includes adjusting the timing of the start of the injection relative to the valve opening event as a function of fuel flow.

16 Claims, 6 Drawing Sheets

APPARATUS AND METHODS FOR CONVERTING CONVENTIONALLY FUELED ENGINES TO OPERATE ON AN ALTERNATIVE FUEL

CROSS-REFERENCE TO RELATED APPLICATION

This application is a continuation-in-part of U.S. Ser. No. 758,894, filed Sep. 11, 1991 and entitled "Apparatus and Method for Converting Conventionally Fueled Engines to Operate on an Alternative Fuel", now U.S. Pat. No. 5,150,685.

TECHNICAL FIELD

This invention relates to internal combustion engines which run on alternative fuels, and more particularly to an apparatus and methods for converting conventionally fueled engines to operate with a gaseous alternative fuel.

BACKGROUND ART

Atmospheric pollution generated by exhaust emissions from conventional gasoline or diesel powered internal combustion engines is a well documented problem. One recognized method of reducing noxious emissions is to replace the conventional fuel with a cleaner burning alternative fuel. For example, U.S. Pat. Nos. 4,711,223 and 4,635,608 issued to Carroll teach an alcohol fueled engine. Similarly, U.S. Pat. No. 4,112,875 issued to Laumann et al. discloses a hydrogen-oxygen fueled engine.

A problem with such alternative fuels is that they generally have less energy per unit volume than gasoline or diesel fuel, and therefore the power available from alternatively fueled engines is often reduced. To minimize the effects of this problem, designers have proposed to run such engines on a mixture of the alternative fuel with gasoline. See, for example, U.S. Pat. No. 4,995,367 issued to Yamauchi et al. Yamauchi teaches a system for controlling both fuel injection and ignition timing in an internal combustion engine operating on a fuel mixture such as gasoline and methanol. Similarly, U.S. Pat. No. 4,876,988 issued to Paul et al. teaches a combined fuel engine in which an auxiliary fuel such as methanol, ethanol or liquified natural gas high in hydrogen may be injected in various proportions with a conventional fuel. See also, U.S. Pat. No. 4,865,001 issued to Jensen which teaches the use of natural gas to supplement conventional diesel fuel. As disclosed by Jensen, a gaseous fuel injector valve is regulated according to certain sensed engine operating parameters, including the gaseous fuel temperature.

A problem with these supplementary systems is that they generally require a separate fuel transportation system for the alternative fuel. These transportation systems are often duplicative of those already in place for the transport of gasoline or diesel fuel, and thus increase the weight and cost of the vehicle due to the use of redundant parts. See, for example, U.S. Pat. No. 4,495,930 to Nakajima which discloses an internal combustion engine which utilizes separate gasoline and alcohol fuel injectors, as well as separate fuel transportation systems. As disclosed by Nakajima, the sets of injectors are separately controlled by a control system which outputs separate pulse width injection command signals. U.S. Pat. No. 5,092,305 to King discloses a fuel control system in which the fuel control signals generated by a primary fuel control computer are modified by an alternative fuel control module and are used to activate an independent fuel control valve to supply an alternative fuel to the engine.

One way of reducing the number of redundant parts when using an alternative fuel has been proposed by U.S. Pat. No. 4,922,862 to Cassacci. Cassacci discloses a system for supplying different fuels such as liquid petroleum gas or compressed natural gas to Otto engines with electronic fuel injection. As disclosed by Cassacci, the original injection nozzle and electronic control box are used, and a signal multiplier is added between the injection nozzle and the control box. The signal multiplier modifies the parameters leading the control box in accordance with a constant correction value to control the quantity of gas injected and to advance the spark plug ignition.

SUMMARY OF THE INVENTION

The present invention provides novel methods for converting conventionally fueled engines to operate on an alternative fuel. As disclosed and claimed herein, an electronic translator converts conventional fuel injector control signals generated by a standard electronic control module to an intermediate alternative fuel injector control signal, based upon the temperature of the alternative fuel and an application of the energy content differential between the conventional and alternative fuels. The electronic translator then generates a final alternative fuel injector control signal based on the flow and operating characteristics of the alternative fuel injector.

In a first embodiment of the present invention, the final alternative fuel injector control signal is transmitted to a first alternative fuel injector until the load on the engine increases past the capacity of the first alternative fuel injector, and thereafter the final alternative fuel injector control signal is transmitted to the first alternative fuel injector and a second alternative fuel injector. In a second embodiment of the present invention, the final alternative fuel injector control signal is synchronized among a plurality of alternative fuel injectors.

In a third embodiment of the present invention, the final alternative fuel injector control signal is adjusted as a function of the time ($t_\alpha$) between the control signal to the conventional fuel injector and a point of a valve opening event, and further as a function of the time ($t_\beta$) between the point of the valve opening event and the optimum point at which to actuate the alternative fuel injector. Thereafter, the final alternative fuel injector control signal is transmitted to the alternative fuel injector. In a fourth embodiment of the present invention, the final alternative fuel injector control signal is alternately transmitted among a plurality of throttle body alternative fuel injectors. In a fifth embodiment of the present invention, the timing of the start of the final alternative fuel injector control signal is varied as a function of the fuel flow rate demanded by the engine before the final alternative fuel injector control signal is transmitted to the alternative fuel injector.

Accordingly, it is an object of the present invention to provide methods of the type described above which convert conventional fuel injector control signals to an alternative fuel injector control signal as a function of the energy content differential between the conventional fuel and a gaseous alternative fuel, as a function of the differences in operating and flow characteristics of an alternative fuel injector relative to a conventional fuel injector, and also as a function of the temperature of the alternative fuel.

Still another object of the present invention is to provide methods of the type described above in which a final alternative fuel injector control signal is manipulated according to the specific type of conventional fuel injectors and alternative fuel injectors available for a particular engine.

These and other objects, features and advantages of the present invention will be more apparent from the following description and drawings.

BEST MODE FOR CARRYING OUT THE INVENTION

With reference to the drawings, the preferred embodiment of the present invention will be described.

Figure 1:
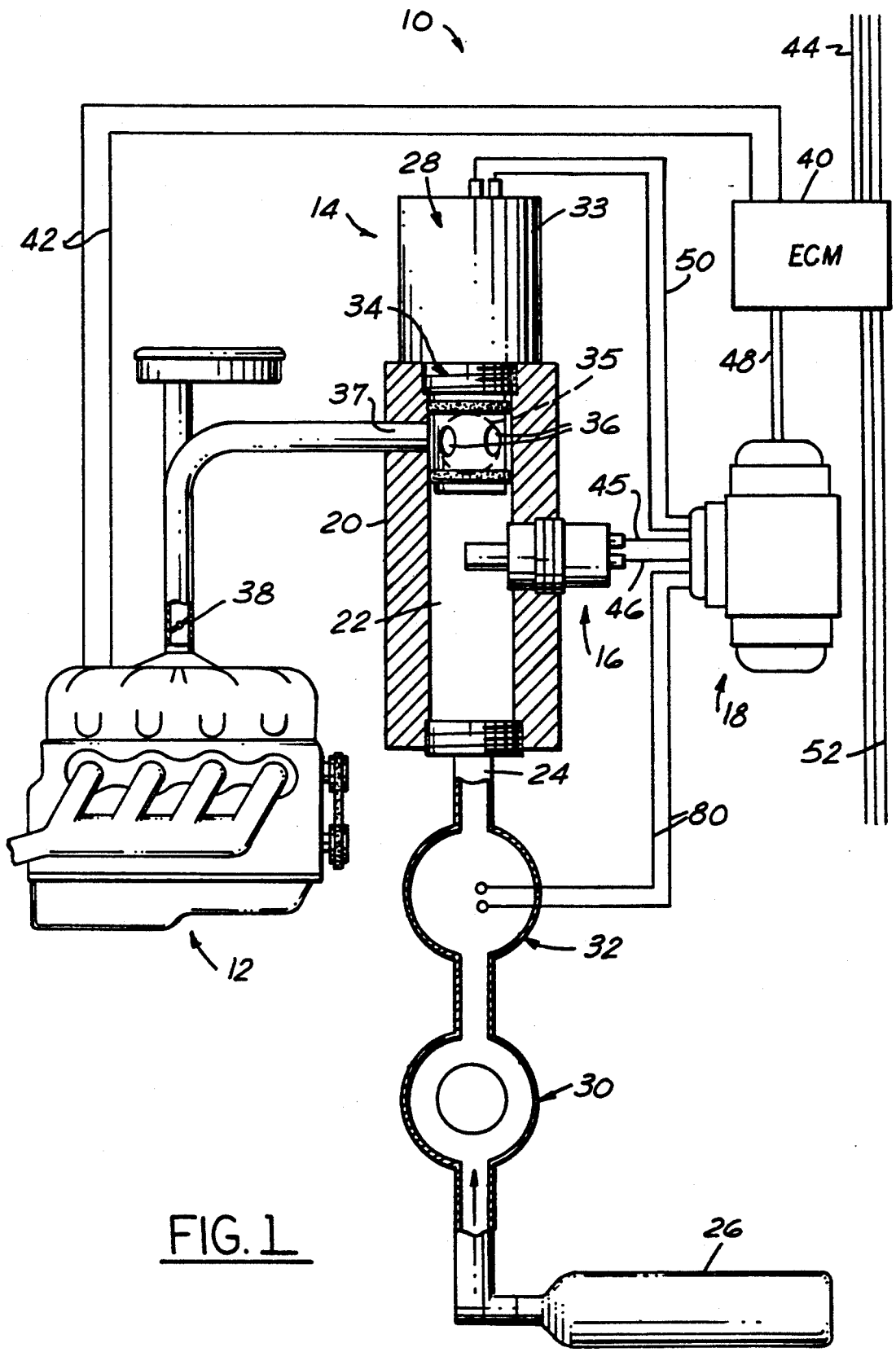
FIG. 1 is a schematic diagram of an apparatus for converting a conventionally fueled internal combustion engine to operate with an alternative fuel, according to the present invention.

FIG. 1 shows an apparatus generally designated by reference numeral 10 for converting a throttle body fuel injected internal combustion engine 12 normally operated with a conventional fuel such as gasoline to operate with an alternative fuel. The apparatus 10 comprises an alternative fuel introduction assembly 14, a temperature sensor 16, and an electronic translator 18. The alternative fuel introduction assembly 14 includes a housing 20 having an interior chamber 22, an inlet passage 24 in fluid communication with a source 26 of the alternative fuel, and an alternative fuel injector 28. For purposes of illustration, a single alternative fuel introduction assembly 14 utilizing a single alternative fuel injector 28 is shown. However, it should be understood that the alternative fuel introduction assembly 14 may have a plurality of injectors 28, or multiple assemblies 14 may be used. In the preferred embodiment, two alternative fuel injectors 28 are used in a single assembly 14.

The alternative fuel is kept as a compressed gas or liquid in the alternative fuel tank 26 and when released by a pressure regulator 30 flows past a shutoff valve 32, through the inlet passage 24, and into the interior chamber 22. The alternative fuel may be any one which assumes a gaseous phase when introduced into the interior chamber 22 at normal operating temperatures and pressures. Typically, operating temperatures in the interior chamber 22 range between −40 and 220 degrees Fahrenheit, with pressures up to 200 pounds per square inch (psi). Natural gas is the preferred alternative fuel for use with the present invention. However, pure methane is also suitable and may be used as an alternative fuel in accordance with the present invention.

Still referring to FIG. 1, alternative fuel injector 28 preferably comprises a solenoid portion 33 and a valve container portion 34 threadingly engaged with the housing 20 and extending partially into the interior chamber 22. The alternative fuel injector 28 is movable between an open position and a closed position. In the open position, a conventional ball or valve 35 within the valve container portion 34 moves when the solenoid portion 33 is energized to allow gaseous alternative fuel to flow through orifices 36 located in the outside of the valve container portion 34. With the orifices 36 so exposed, the interior chamber 22 is in fluid communication with the engine 12 through the orifices 36, an outlet nozzle 37, and a throttle 38. Although FIG. 1 shows the alternative fuel being introduced upstream from the throttle 38, it should be appreciated that the alternative fuel may instead be introduced downstream of the throttle 38. In the closed position shown in FIG. 1, the solenoid portion 33 is not energized, and the valve 35 reseats so that the interior chamber 22 is sealed from fluid communication with the engine 12. A suitable alternative fuel injector for this purpose is an HSV 3000, manufactured by Servojet Products International of San Diego, Calif.

Preferably, the pressure of the alternative fuel in the interior chamber 22 is maintained at approximately 175 psi, but should be at least sufficient to establish sonic flow characteristics through the alternative fuel injector 28. In the preferred embodiment shown in FIG. 1, it is thus necessary that the ratio of the pressure in the interior chamber 22 divided by the pressure at the outlet nozzle 37 (which is normally at or near atmospheric pressure) be maintained above the critical pressure ratio. For the preferred embodiment, therefore, the pressure in the interior chamber 22 should be at least 50 psi.

An engine electronic control module (ECM) 40 is typically utilized in conventionally powered fuel injected motor vehicles to control the vehicle's conventional fuel injectors (not shown). This is accomplished by generating electronic pulses of a certain voltage, the duration of which controls the time the conventional injectors will be conditioned to supply fuel to the engine. The duration of the electronic pulses is known as the pulse width, and is calculated by an algorithm hard wired in the electronic control module 40. The algorithm calculates a base pulse width term which may be designated $t_1$ from a set of variables corresponding to sensor readings such as the oxygen content of the engine exhaust gases, engine revolutions per minute, coolant temperature, intake manifold air temperature, manifold pressure, vehicle speed, throttle position, and engine knock. This information is typically supplied to the electronic control module 40 via lines 42 and 44.

Electronic control module 40 also contains a calibration programmable read only memory (PROM). The PROM contains values in look up tables which are normally utilized by conventional fuel injection systems when particular engine operating contingencies occur. For example, gasoline is known to periodically saturate the intake manifold of conventional engines. In anticipation of this condition, the standard PROM may be programmed to react by interrupting the supply of gasoline to the conventional injectors. It should be noted, however, that a gaseous alternative fuel as used in the present invention will not saturate the intake manifold. Therefore, this type of fuel interruption contingency is unnecessary in the present invention and is referenced only for illustrative purposes. In the present invention, the PROM is recalibrated for optimal operation with the alternative fuel.

Still referring to FIG. 1, the temperature sensor 16 is adapted to measure the temperature of the alternative fuel. A reference signal having a voltage of five volts, for example, is provided by the electronic translator 18 on line 45. A return signal is also provided on line 46. This signal, in accordance with the present invention, is interpreted by the electronic translator 18 to identify the temperature of the alternative fuel.

It is known that the energy content of a given gaseous fuel is directly proportional to its mass. Thus, when provided a constant volume such as in interior chamber 22, the energy content which is available to the engine from a gaseous fuel is directly proportional to the pressure of the gaseous fuel and inversely proportional to its temperature. Therefore, assuming a constant pressure through the regulator 30, the most accurate estimate of the energy deliverable to the engine 12 per alternative fuel injector cycle is obtained by measuring the temperature of the alternative gaseous fuel near its point of injection. Accordingly, the temperature sensor 16 is placed in the interior chamber 22 or proximate thereto. It should be understood, however, that the temperature reading may also be taken at other appropriate locations.

The electronic translator 18 of the present invention is adapted to receive conventional fuel injector control signals which are output by the electronic control module 40 via lines 48, and the output signal from the temperature sensor 16 output via line 46. As seen in FIG. 1, lines 48 are in electrical contact with electronic control module 40 and electronic translator 18 The electronic translator 18 then generates an intermediate alternative fuel injector control signal $t_2$ indicative of the energy demanded by the engine 12, based upon the energy content of the alternative fuel in the known volume of the interior chamber 22, at the known pressure and sensed temperature.

Generation Of The Intermediate Alternative Fuel Injector Control Signal

Figure 2:
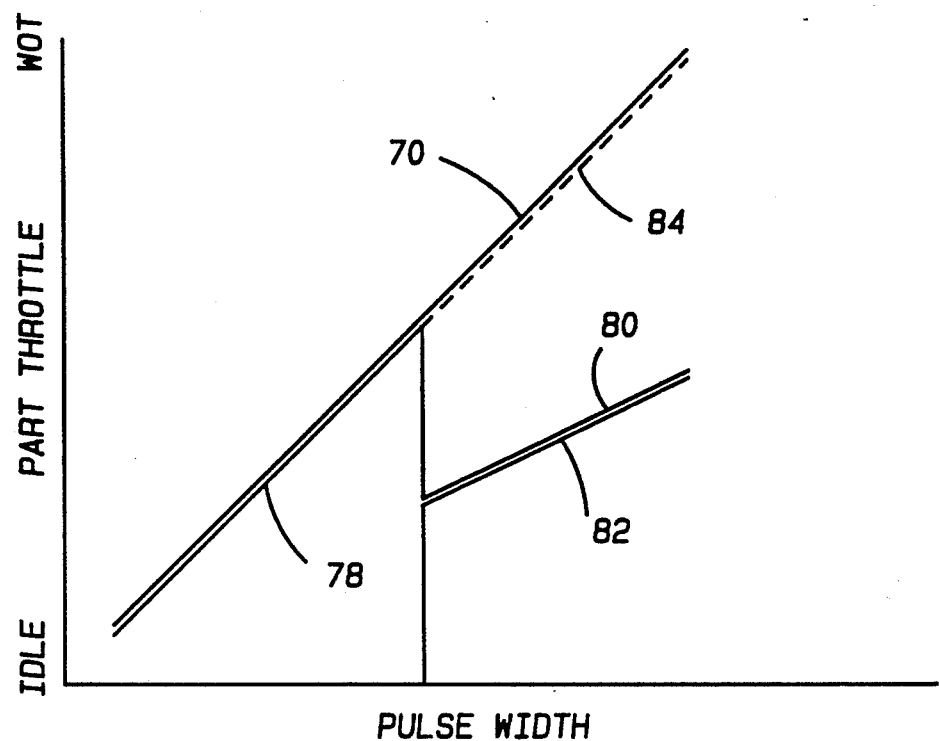
FIG. 2 is a comparative graph of the pulse width of an injector control signal versus energy delivered to the engine by (1) a conventional fuel injector, and (2) an alternative fuel introduction assembly of the present invention.

As shown by the curve 70 in FIG. 2, the energy ($\dot{E}$) deliverable to the engine by a conventional liquid fuel injector per injection is a generally linear function between engine idle and wide open throttle of the time $t_1$ the valve of the conventional fuel injector remains open:

$$\dot{E} = M_1 t_1 + B_1$$

The slope $M_1$ of the curve 70 depends on actual flow and operating characteristics such as the orifice size of the conventional fuel injector. The intercept $B_1$ corresponds to the energy delivered the conventional fuel injector valve is open for zero time, and may be assumed to approach zero. Because the valve normally does not respond below a minimum pulse width of about 1.5 milliseconds, this is a reasonable model.

The energy deliverable by a gaseous alternative fuel, which is directly proportional to its mass flow rate $\dot{m}$, may be written $$\dot{E} = M_2 t_2 + B_2$$

Because an alternative fuel system must approximate the conventional fuel energy delivery schedule, the above equations may be equated to solve for $t_2$, the theoretical time an alternative fuel injector with equivalent operating and flow characteristics as the conventional injector must remain open to deliver the same amount of energy:

$$t_2 = \frac{M_1 t_1 + B_1 - B_2}{M_2}$$

Because it is further recognized that $B_1$ and $B_2$ must go to zero, $t_2$ may be written as $$t_2 = \frac{M_1}{M_2} t_1$$

It is also recognized that $M_1/M_2$ is theoretically a constant which may be designated $C_1$. In practice, this constant term may have to be calibrated for differences in stoichiometric ratios.

For a sonic nozzle, the following formulae are applicable:

$$\dot{m} = \frac{P_2 * C_d * A * \sqrt{K * g * R * T_2}}{R * T_2} * 453.6 \quad (1)$$

$$\dot{m} = q_{gas}/t_2 \quad (2)$$

$$P_{RC} = (2/R + 1)^{(\frac{k}{k-1})} \quad (3)$$

$$P_2 = P_1 * P_{RC} \quad (4)$$

$$T_2 = T_1/(1 + (k-1)/2) \quad (5)$$

Where:

| | | |
|---|---|---|
| | $q_{gas}$ = | mass injection rate of gaseous alternative fuel (mg/injection) |
| | $\dot{m}$ = | mass flow rate of gaseous alternative fuel |
| (Known) | $T_1$ = | inlet temperature |
| | $T_2$ = | outlet temperature |
| (Known) | $P_1$ = | inlet pressure |
| | $P_2$ = | outlet pressure |
| | $P_{RC}$ = | critical pressure ratio |
| (Known) | $g$ = | gravity |
| (Known) | $k$ = | gas constant |
| | $t_2$ = | intermediate injection duration term for alternative fuel injector |
| (Known) | $A$ = | discharge area |
| (Known) | $C_d$ = | discharge coefficient |
| (Known) | $R$ = | specific heat ratio of gaseous alternative fuel |

Substituting equation 1 into equation 2 for m and solving $t_2$, gives $$t_2 = \frac{q_{gas} * R * T_2}{P_2 * C_d * A * \sqrt{k*g*R*T_2} \ *453.6}$$

Further substitution of equations 4 and 5 for $P_2$ and $T_2$ gives $$t_2 = \frac{q_{gas} * R * \frac{T_1}{(1 + (k-1)/2)}}{P_1 * P_{RC} * C_d * A * \sqrt{k*g*R* \frac{T_1}{(1 + (k-1)/2)}} \ *453.6}$$

Substituting for $P_{RC}$ with equation 3 and reducing gives $$t_2 = \frac{q_{gas} * C_3 * T_1}{\sqrt{\frac{T_1}{C_2}}}$$

Where $C_2$ is a constant equal to $$\frac{1}{\left( (453.6) P_1 \left( \frac{2}{R+1} \right)^{(\frac{k}{k-1})} C_d A \sqrt{\frac{kgR}{1 + (k-1)/2}} \right)^2}$$

and $C_3$ is a constant equal to $R/(1+(k-1)/2)$.

If $q_{gas}$ is expressed in terms of energy delivered, $$t_2 = \frac{\dot{E} * C_3 * T_1}{\sqrt{\frac{T_1}{C_2}}}$$

Substituting $$E = M_2(t_1 * C_1) + B_2$$

and a new constant $C_4$ equal to $M_1$ times $C_3$ gives an intermediate pulse term of the alternative fuel injector 14:

$$t_2 = \frac{t_1 * C_4 * T_1}{\sqrt{\frac{T_1}{C_2}}}$$

Experimentation has established working values in the preferred embodiment for $C_4$ and $C_2$ as 0.0041523 and 1.16, respectively.

The intermediate base pulse width signal $t_2$ is thus calculated as a function of the fuel energy content differential between the conventional fuel and the alternative fuel, and the temperature of the alternative fuel $T_1$ as measured by the temperature sensor 16.

Generation of the Final Alternative Fuel Injector Control Signal

The intermediate signal $t_2$ is further adjusted by the electronic translator 18 because the characteristics of the alternative fuel injection system normally differ from those of the conventional fuel injection system. The adjustment of the intermediate alternative injector signal $t_2$ to a final alternative fuel injector control signal $t_3$ is based on the number of alternative fuel injectors used, their operating characteristics, and their flow characteristics.

Figure 3:
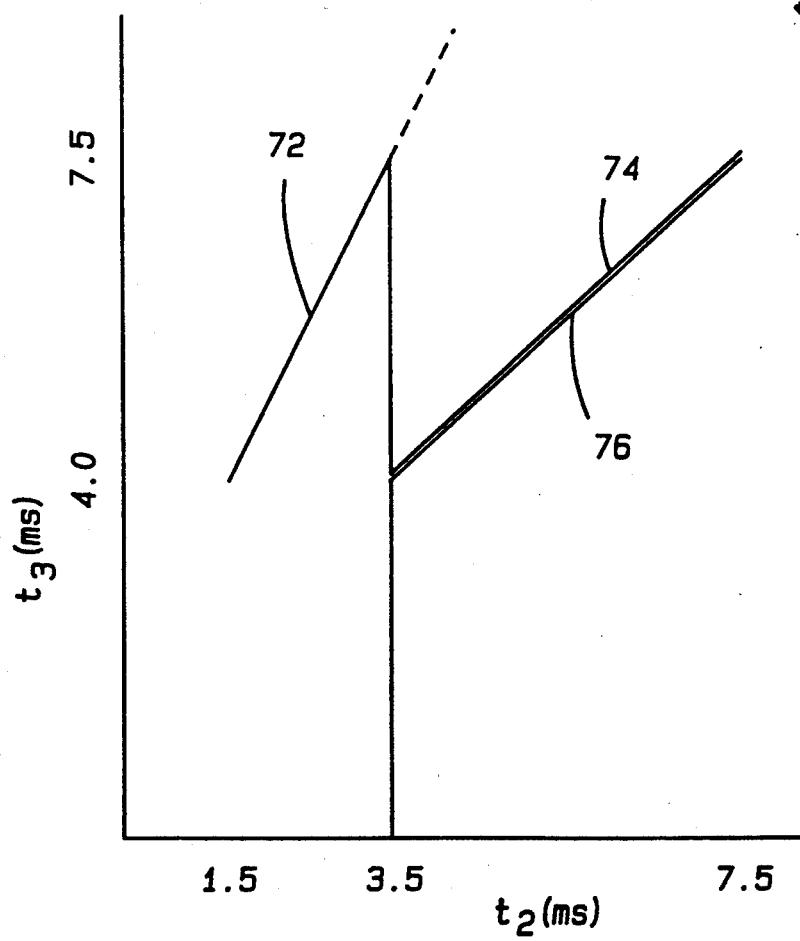
FIG. 3 is a graph of an intermediate alternative fuel injector control signal as generated by an electronic translator of the present invention versus the final alternative fuel injector control signal generated by the electronic translator.

A single primary alternative fuel injector delivers a predictable flow throughout its linear operating range, which in the preferred embodiment is 4 to 26 milliseconds. For a throttle body fuel injection system producing maximum horsepower at 4000 rpm, the maximum feasible pulse width is about 7.5 milliseconds. Thus, the final signal $t_3$ cannot exceed this upper limit. As shown in FIG. 3, therefore, the intermediate signal $t_2$ preferably between about 1.5 and 3.5 milliseconds is translated to the final signal $t_3$ having a pulse width of about 4.0 to 7.5 milliseconds. The slope of the curve 72 is also a function of the mass flow rate through the alternative fuel injector. The mass flow rate is determined by flow and operating characteristics of the system, such as the pressure of the flow through the alternative fuel injectors, the size of the ball seat or orifice, and the stroke of the alternative fuel injector valve. In the preferred embodiment, the ball seat or orifice size is about 0.094 inch, and the stroke is about 0.023 inch.

The energy deliverable by a single primary alternative fuel injector may only partially satisfy the energy requirements of the engine, however. As load on the engine increases past the capacity of the single alternative fuel injector, a second alternative fuel injector is activated at a value of $t_2$ which will allow both primary and secondary alternative fuel injectors to operate within their effective linear pulse width range. The combined on time of the primary and secondary alternative fuel injectors as shown by the lines 74 and 76, respectively, is tailored to supply the appropriate total energy requirements of the engine without exceeding the maximum allowable value of $t_3$.

Phase In Method

Referring again to FIG. 2, line 78 shows that the single alternative fuel injector is sufficient to approximate the energy delivery curve of the conventional fuel injector system curve 70 up to a part throttle point where the alternative fuel injector 28 operates at its maximum allowable pulse width. Thereafter, the energy delivered by the primary and secondary alternative fuel injectors, as shown by the lines 80 and 82, combines to approximate the conventional fuel injection system all the way through wide open throttle (WOT), as shown by broken line 84. Additional alternative fuel injectors may be added to supply greater energy requirements, and similarly phased in, if energy demand increases.

Referring again to FIG. 1, the final alternative fuel injector control signal $t_3$ is generated by the electronic translator 18 through electronic pulsewidth modulation, and output to the alternative fuel injector 28 via electrical lines 50 to control the period of time the alternative fuel injector 28 remains in the open position. This process meters the flow of the alternative fuel to the engine 12, and is continuously adjustable as engine operating conditions vary. The remaining signals normally output by the electronic control module 40 to other engine controls via lines 52 bypass the translator 18 entirely, but alternatively could be wired into the translator to pass through undisturbed.

The regulator 30 controls the pressure at which the alternative fuel is introduced into the interior chamber 22 from the storage cylinder 26. Normally, this pressure is predetermined and preset by mechanically adjusting a conventional flow valve. As an alternative to pulse width modulation of the alternative fuel injector 28, the energy delivered to the engine 12 can be controlled by active pressure control. Thus, the conventional fuel injector control signals from the electronic control module 40 can be fed directly to the alternative fuel introduction assemblies 14, and energy delivery to the engine controlled by varying the pressure of the alternative fuel as it flows through the regulator 30. A feedback control system changes the flow characteristics to give the desired energy delivery curve, i.e. low pressure for idle and higher pressure for wide open throttle.

The shutoff valve 32 is preferably solenoid operated, energized and deenergized between an open and a closed position, respectively, by the electronic translator 18 via electrical lines 80. The shutoff valve 32 is located downstream from the alternative fuel source 26 and upstream of the inlet passage 24. When injector pulses from the electronic control module 40 are sensed by the electronic translator 18, the shutoff valve 32 is energized and moves to the open position wherein the alternative fuel may be introduced into the interior chamber 22. When no injector pulses are sensed by the electronic translator 18, the shutoff valve 32 assumes the closed position wherein the alternative fuel may not be introduced into the interior chamber 22.

Figure 4:
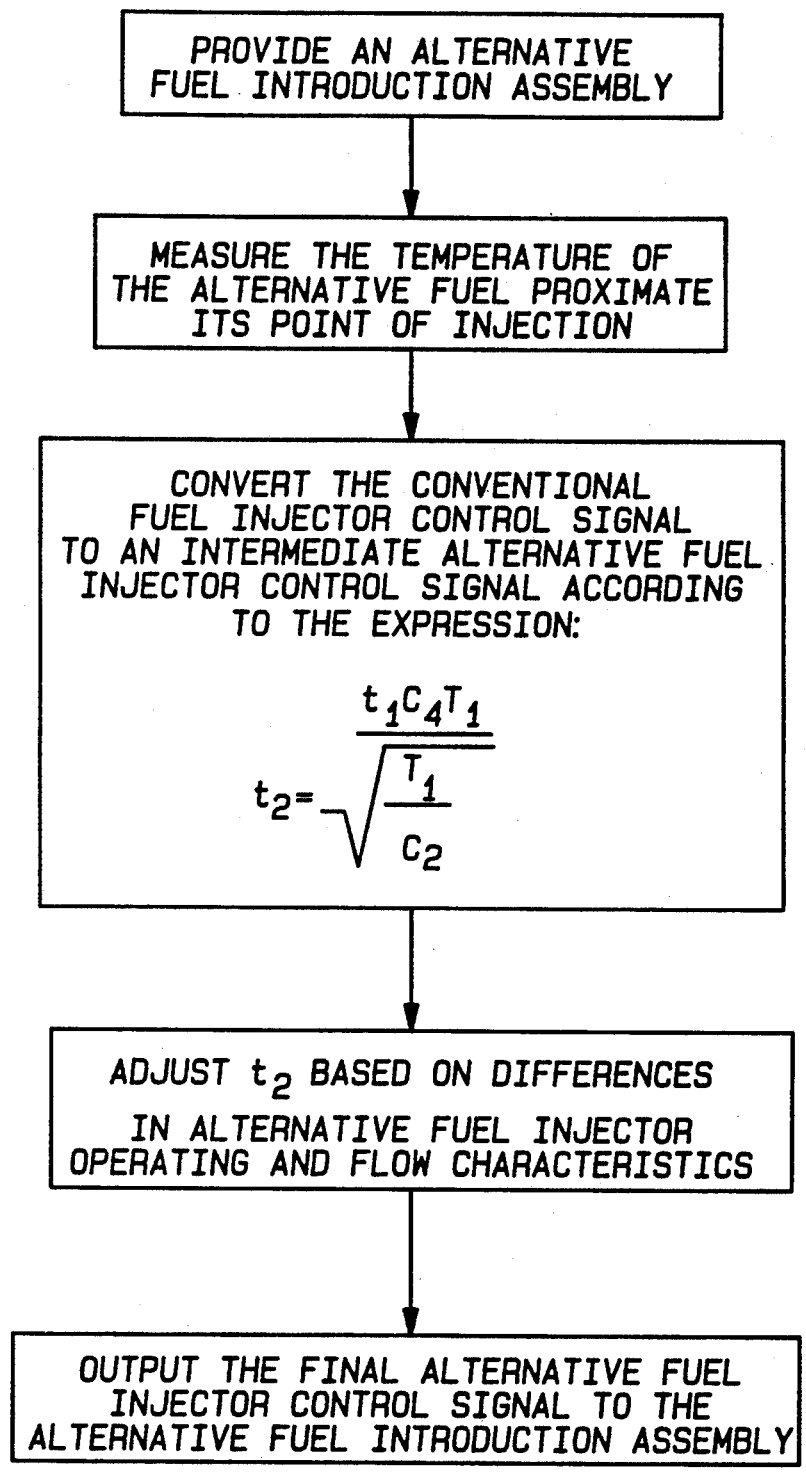
FIG. 4 is a flow chart of the method steps of the present invention required to convert a conventionally fueled internal combustion engine to operate with an alternative fuel.

Referring now to FIG. 4, there is shown a method for converting a conventionally fueled internal combustion engine to operate on an alternative fuel. The method is adapted for use with an electronic control module which generates control signals to conventional fuel injectors. The method comprises providing an alternative fuel introduction assembly having an alternative fuel injector, the alternative fuel injector being movable between an open position adapted to supply the alternative fuel to the engine, and a closed position. A source of the alternative fuel is provided to the alternative fuel introduction assembly, and the temperature of the alternative fuel is measured proximate or in the alternative fuel introduction assembly. The conventional fuel injector control signals are then converted to an intermediate alternative fuel injector control signal in response to the temperature of the alternative fuel and in response to the energy content differential between the alternative fuel and the conventional fuel. Preferably, the conversion is accomplished according to the expression:

$$t_2 = \frac{t_1 * C_4 * T_1}{\sqrt{\frac{T_1}{C_2}}}$$

The intermediate alternative fuel injector signal $t_2$ is then converted to a final alternative fuel injector control signal $t_3$ by the electronic translator to compensate for the number of injectors used and their flow and operating characteristics. Finally, the alternative fuel injector control signal $t_3$ is output to the alternative fuel introduction assembly to control the movement of the alternative fuel injector to the open position, and thereby meter the flow of the alternative fuel to the engine. In this way, the energy requirements of the engine are met throughout its operating range.

The final alternative fuel injector control signal can be further manipulated according to the specific type of conventional fuel injectors and alternative fuel injectors available for a particular engine.

Synchronization Method

As noted previously, there is about 7.5 milliseconds between the onset of consecutive alternative fuel injector control signals when the engine is running at 4,000 rpm, and two throttle body alternative fuel injectors are used:

$$\frac{4000 \text{ rev}}{\text{min}} \times \frac{1 \text{ min}}{60 \text{ sec}} \times \frac{4 \text{ inj}}{2 \text{ rev}} = 133.33 \text{ inj/sec}$$

7.5 milliseconds is therefore the maximum time which either of the two alternative fuel injectors can be open at 4,000 rpm. To thereafter increase the fuel flow to the engine, the pressure in the line to the alternative fuel injectors can be increased, or additional alternative fuel injectors can be phased in. Alternatively, the alternative fuel injector control signals can be synchronized or alternated among two or more alternative fuel injectors at the same time throughout the engine's energy demand range.

Figure 5:
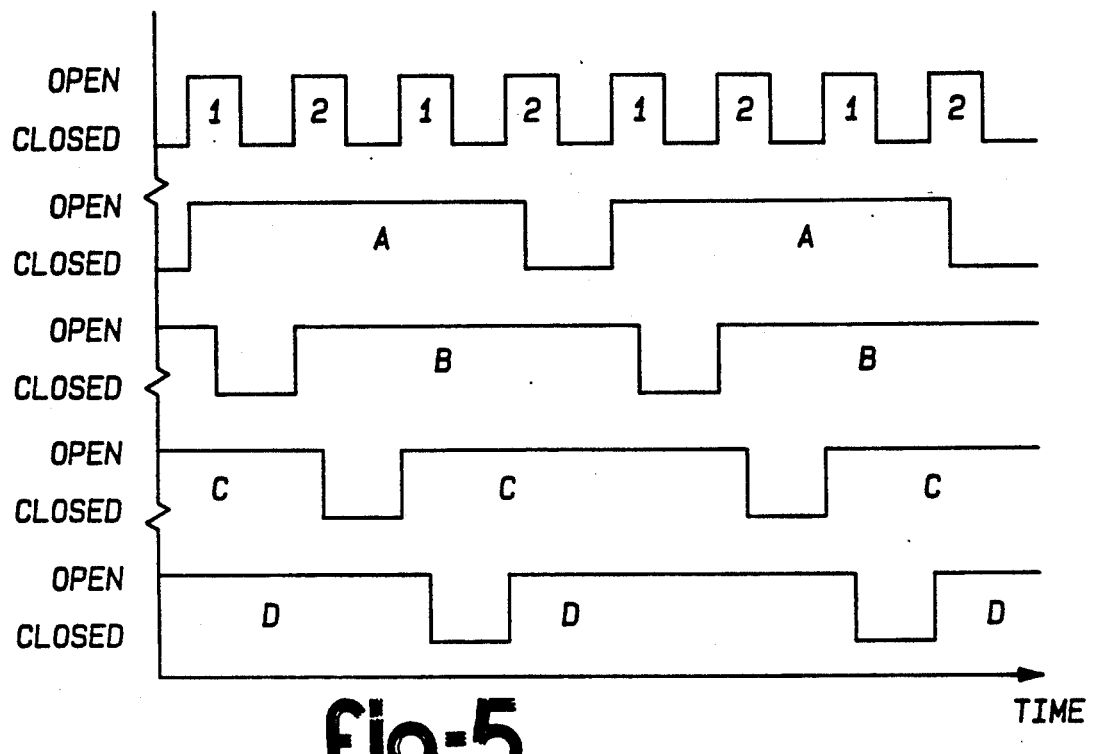
FIG. 5 is a graph of control signals to two conventional fuel injectors and four alternative fuel injectors over two revolutions of a engine.

According to this latter method, a plurality of alternative fuel injectors are provided. For purposes of illustration, four alternative fuel injectors designated A, B, C and D are shown in FIG. 5. The conventional fuel injector control signals, designated 1 and 2 in FIG. 5 to correspond to the two conventional fuel injectors typically found in a standard throttle body injection engine, are produced by the ECM. Over the course of two revolutions of the engine, a total of eight conventional fuel injector control signals are so produced, as shown in FIG. 5.

At the first occurrence of the conventional fuel injector control signal designated by the numeral 1, the translator generates a final alternative fuel injector control signal as described above, and transmits that signal to actuate alternative fuel injector A. At the first occurrence of the conventional fuel injector signal designated by the numeral 2, which immediately follows the first occurrence of the conventional fuel injector control signal designated by the numeral 1, the translator again generates a final alternative fuel injector control signal, and transmits that signal to activate a second alternative fuel injector, designated B in FIG. 5 At the second occurrence of conventional fuel injector control signal No. 1, the translator generates the final alternative fuel injector control signal, and transmits that signal to actuate alternative fuel injector C. This step is repeated for alternative fuel injector D, and then the entire process is repeated for the next revolution of the engine, as shown in FIG. 5. In this way, the final alternative fuel injector control signal is alternately transmitted in series among the alternative fuel injectors.

This synchronization method can be utilized with any number of throttle body or port alternative fuel injectors. With three alternative fuel injectors, each alternative fuel injector can be open at 4000 rpm for 11.25 milliseconds, or 50% longer than is available with only two alternative fuel injectors. With four alternative fuel injectors of the preferred embodiment, 15.0 milliseconds are available. If desired, the translator can be programmed to cap the maximum time during which the alternative fuel injectors are in fluid communication with the engine at something less than the maximum available time, and the pressure in the fuel line can be increased correspondingly to deliver the necessary amount of alternative fuel. Regardless of the number of alternative fuel injectors used, flow and operating characteristics of the system such as the valve orifice size and the pressure in the line can be designed in order to closely approximate the conventional fuel energy delivery curve while maintaining the same injection frequency as the conventional fuel injection system.

Transforming Non-Sequential Conventional Fuel Injector Control Signals To Individual Cylinder Timed Alternative Fuel Injector Control Signals In the embodiments and methods described above, the alternative fuel injector(s) can be actuated at precisely the same time and at the same frequency as the conventional fuel injectors would have been actuated by the ECM. However, most throttle body injection (TBI) and many port fuel injection (PFI) conventional fuel injector systems are non-sequential, i.e. the ECM does not actuate the fuel injectors according to the position of an intake valve of the engine. For example, a TBI system used by General Motors Corporation with a V8 engine generates eight control signals every two revolutions of the engine, corresponding to the eight intake strokes per two revolutions. The control signals are not timed to a specific valve opening event, although an injection usually occurs when the intake stroke is in process.

The injection of alternative fuel need not occur at the same time during the valve opening event as would otherwise be dictated by the ECM. Instead, the timing of the onset of the final alternative fuel injector control signal can be set so that performance of the engine with the alternative fuel is optimized.

Figure 6:
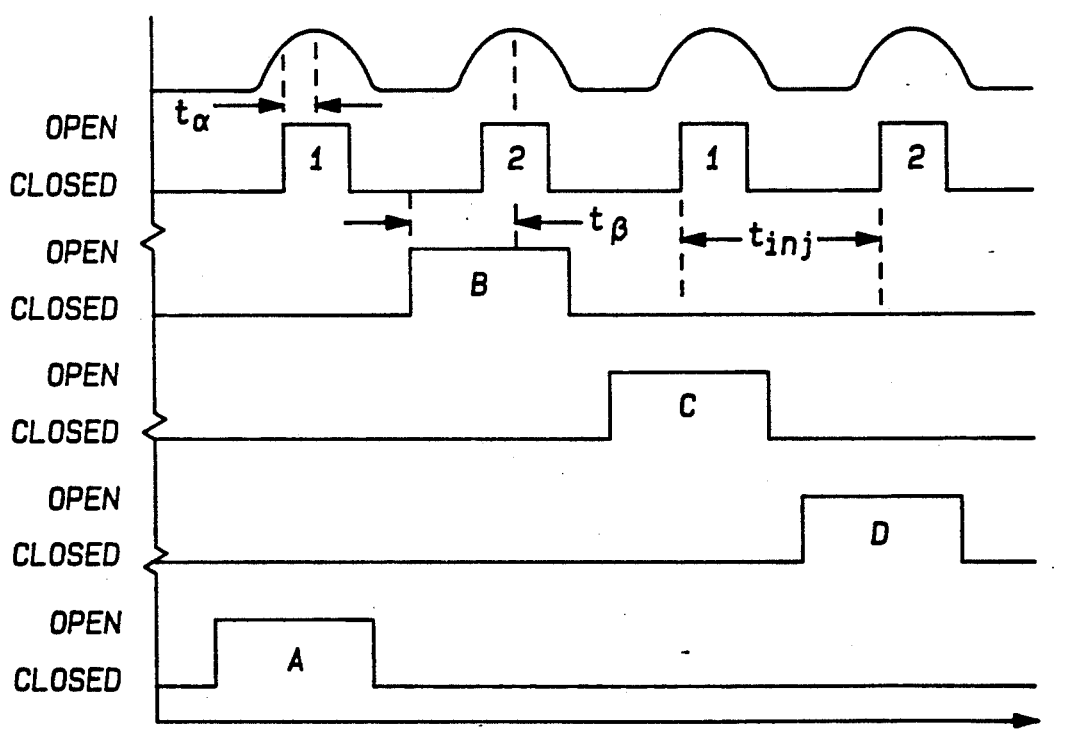
FIG. 6 is a graph of control signals to two conventional fuel injectors and four alternative fuel injectors over one revolution of an eight cylinder engine.

As shown in FIG. 6, the conventional fuel injector control signals of a non-sequential TBI system such as the one described above can be modified to sequentially actuate alternative fuel injectors. To convert the conventional fuel injector control signals, designated by the numerals 1 and 2, to sequentially actuate the alternative fuel injectors, designated A, B, C and D, the following steps are taken:

$t_3$, the final alternative fuel injector control signal, is established as described above;

$t_\alpha$, the time between the onset of the conventional fuel injector control signal and a given point of the valve opening event, such as the valve being fully open, is established. This is preferably done by measurement. The value of $t_\alpha$ can be positive or negative;

$t_\beta$, the time between the given point of the valve opening event and the optimum point at which to actuate the alternative fuel injector, is established by experimentation. The value of $t_\beta$ may also be positive or negative, and is dependent on such criteria as the manifold vacuum pressure and the engine speed;

$t_{inj}$, the time between successive control signals for the first and second conventional fuel injectors, is established. This can be measured by the translator software;

An alternative fuel injector, for example the one designated in FIG. 6 as B, is actuated for the duration of the pulse width $t_3$ beginning at a time after the control signal to the numeral 1 conventional fuel injector equal to the standard interval $t_{inj}$, plus a correction factor equal to $t_\alpha - t_\beta$;

The next alternative fuel injector, designated C in FIG. 6, is actuated beginning at a time after the control signal to the numeral 2 conventional fuel injector equal to $(t_{inj} + t_\alpha - t_\beta)$;

The next alternative fuel injector, designated D, is actuated beginning at a time after the second control signal to the numeral 1 conventional fuel injector equal to $(t_{inj} + t_\alpha - t_\beta)$;

The next alternative fuel injector, designated A, is actuated beginning at a time after the second control signal to the numeral 2 conventional fuel injector equal to $(t_{inj} + t_\alpha - t_\beta)$.

When this process is continually repeated, the alternative fuel injectors are converted to fire sequentially, i.e. timed to a specific point of the valve event for each cylinder. Although FIG. 6 shows only four alternative fuel injectors necessary to match the four intake strokes of one revolution of an eight cylinder engine, it should be understood that the process is extrapolated over another four alternative fuel injectors for the four intake strokes of the other four cylinders of the eight cylinder engine. It should be further understood that this method can be used with either port or throttle body alternative fuel injectors.

Another non-sequential conventional fuel injection system is represented by the Ford 4.9 liter L-6 multiport system. This system uses one conventional fuel injector for each cylinder, but does not necessarily actuate each injector during the corresponding cylinder intake stroke. Instead, the Ford multiport system actuates three conventional fuel injectors at the same time to supply conventional fuel for the next three valve openings, then actuates the other three injectors together, and so on.

Figure 7:
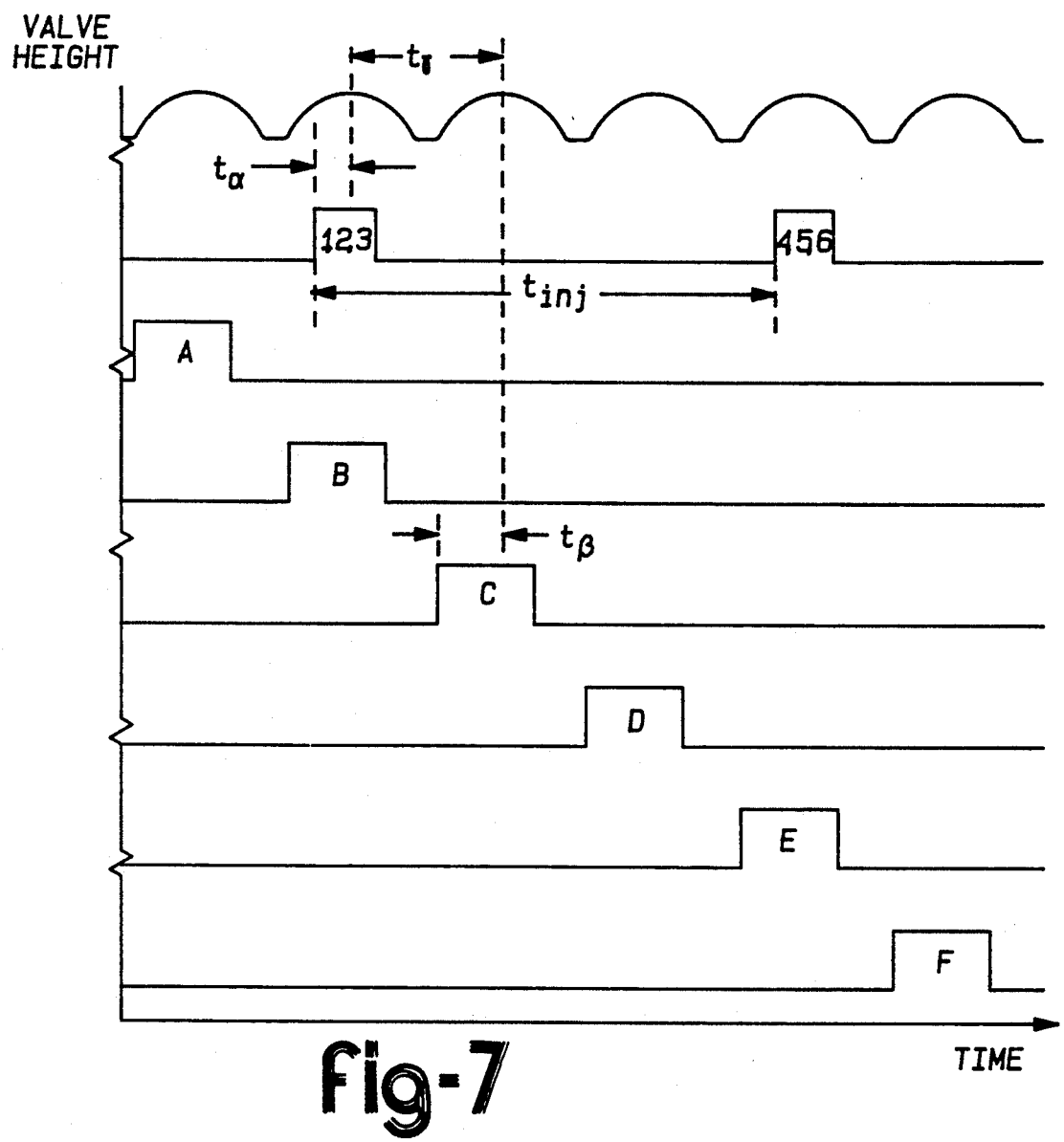
FIG. 7 is a graph of control signals to six conventional fuel injectors and four alternative fuel injectors over two revolutions of a six cylinder engine.

As shown in FIG. 7, to convert the Ford 4.9 liter PFI system to sequentially actuate alternative fuel injectors, the following steps are performed:

Generating the final alternative fuel injector control signal $t_3$, as described above;

Establishing $t_\alpha$ by measurement and establishing $t_\beta$ by test, as described above;

Having the translator software continuously establish $t_\gamma$, which equals the time between consecutive conventional fuel injections ($t_{inj}$) divided by 3;

Actuating one of the alternative fuel injectors, designated in FIG. 7 as C, for the duration of the pulse width $t_3$ beginning at a time after the control signal (1, 2, 3) equal to $t_\gamma + t_\alpha - t_\beta$;

Actuating the next alternative fuel injector, D, at a time after the control signal (1, 2, 3) equal to $2t_\gamma + t_\alpha - t_\beta$;

Actuating the next alternative fuel injector, E, at a time after the control signal (1, 2, 3) equal to $3t_\gamma + t_\alpha - t_\beta$;

Actuating the next alternative fuel injector, F, at a time after the control signal (4, 5, 6) equal to $t_\gamma + t_\alpha - t_\beta$;

Actuating the next alternative fuel injector, A, at a time after the control signal (4, 5, 6) equal to $2t_\gamma + t_\alpha - t_\beta$;

Actuating the next alternative fuel injector, B, at a time after the control signal (4, 5, 6) equal to $3t_\gamma + t_\alpha - t_\beta$.

When these steps are continually repeated, a six injector, non-sequential port injection system is converted to a sequential alternative fuel injection system.

Figure 8:
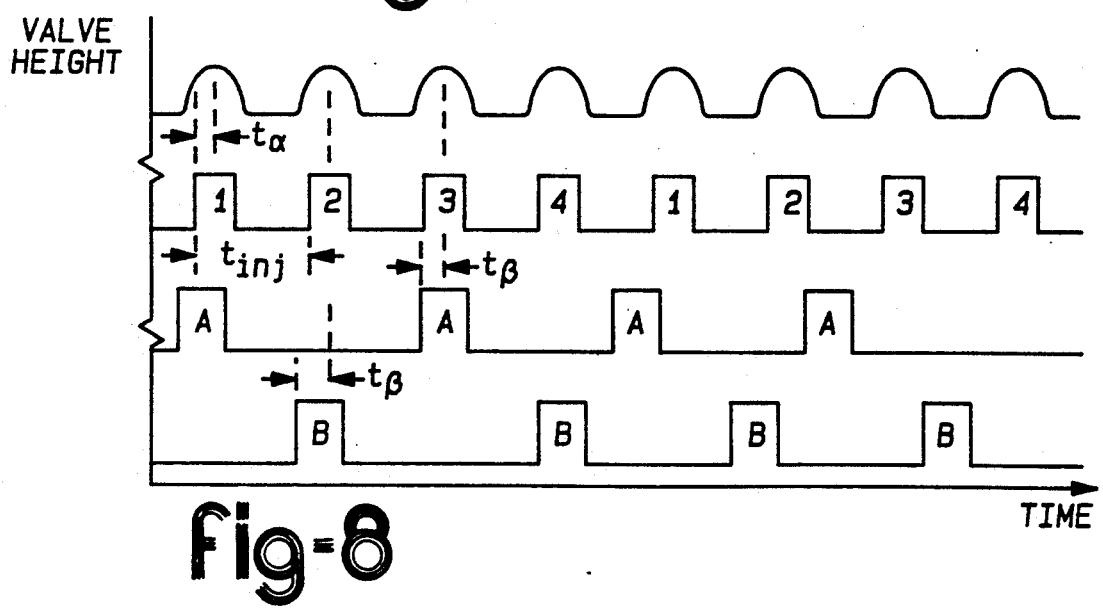
FIG. 8 is a graph of control signals to four conventional fuel injectors and two alternative fuel injectors over four revolutions of a four cylinder engine.

Transforming Sequential Multi-Port Conventional Fuel Injector Control Signals To Throttle Body Alternative Fuel Injector Control Signals A sequential PFI system using one conventional fuel injector per cylinder can also be converted to a TBI system using alternative fuel injectors. For the four cylinder engine depicted in FIG. 8, the ECM generates conventional fuel control signals 1, 2, 3 and 4 as shown corresponding to the four port conventional fuel injectors. To modify these conventional fuel injector control signals for use with a TBI engine using only two alternative fuel injectors, the final alternative fuel injector control signal $t_3$ is first generated. Thereafter, the final alternative fuel injector control signal is alternately transmitted among the throttle body alternative fuel injectors, i.e. the alternative fuel injector designated A is triggered alternately by conventional fuel injector control signals 2 and 4. Similarly, alternative fuel injector B is actuated alternately by injectors 1 and then 3. To optimize the performance of the engine with the alternative fuel, the timing and duration of the alternative fuel injector control signals are established as a function of $t_3$, $t_{inj}$, $t_\alpha$, and $t_\beta$ as described above. Thus the alternative fuel injector designated B is actuated in the first instance shown in FIG. 8 at a time equal to $(t_{inj} + t_\alpha - t_\beta)$ after the onset of the first conventional fuel injector control signal designated by the numeral 1.

An advantage of this conversion is that the engine can be run on either the conventional fuel using the original conventional fuel port injectors o the alternative fuel using the alternative fuel throttle body injectors. It should be apparent that the above method for transforming sequential multi-port conventional fuel injection control signals to throttle body alternative fuel injector control signals can be used to convert a system having any number of conventional fuel injectors to operate with any number of alternative fuel injectors. For example, an eight cylinder conventional fuel PFI system can be converted to a two alternative fuel injector TBI system, or a four-cylinder PFI system can be converted to a six alternative fuel injector TBI system.

Adjusting The Timing Of The Start Of Injection Relative To The Vale Opening Event As A Function Of Fuel Flow In any of the above described methods, the timing of the actuation of an alternative fuel injector relative to the valve opening event can also be varied. This may be desirable, for instance, as the duration of the alternative fuel injector control signals becomes relatively high, and thereby threatens to begin or end while the intake valve is closed.

Figure 9:
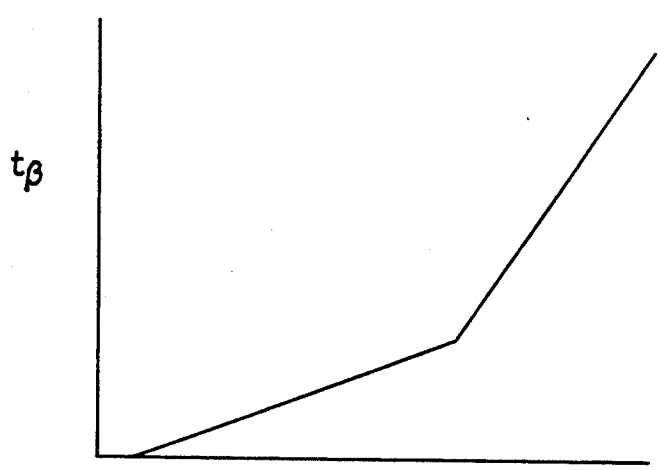
FIG. 9 is a graph of incoming pulse width $PW_i$ versus a variable $t_\beta$.
Figure 10:
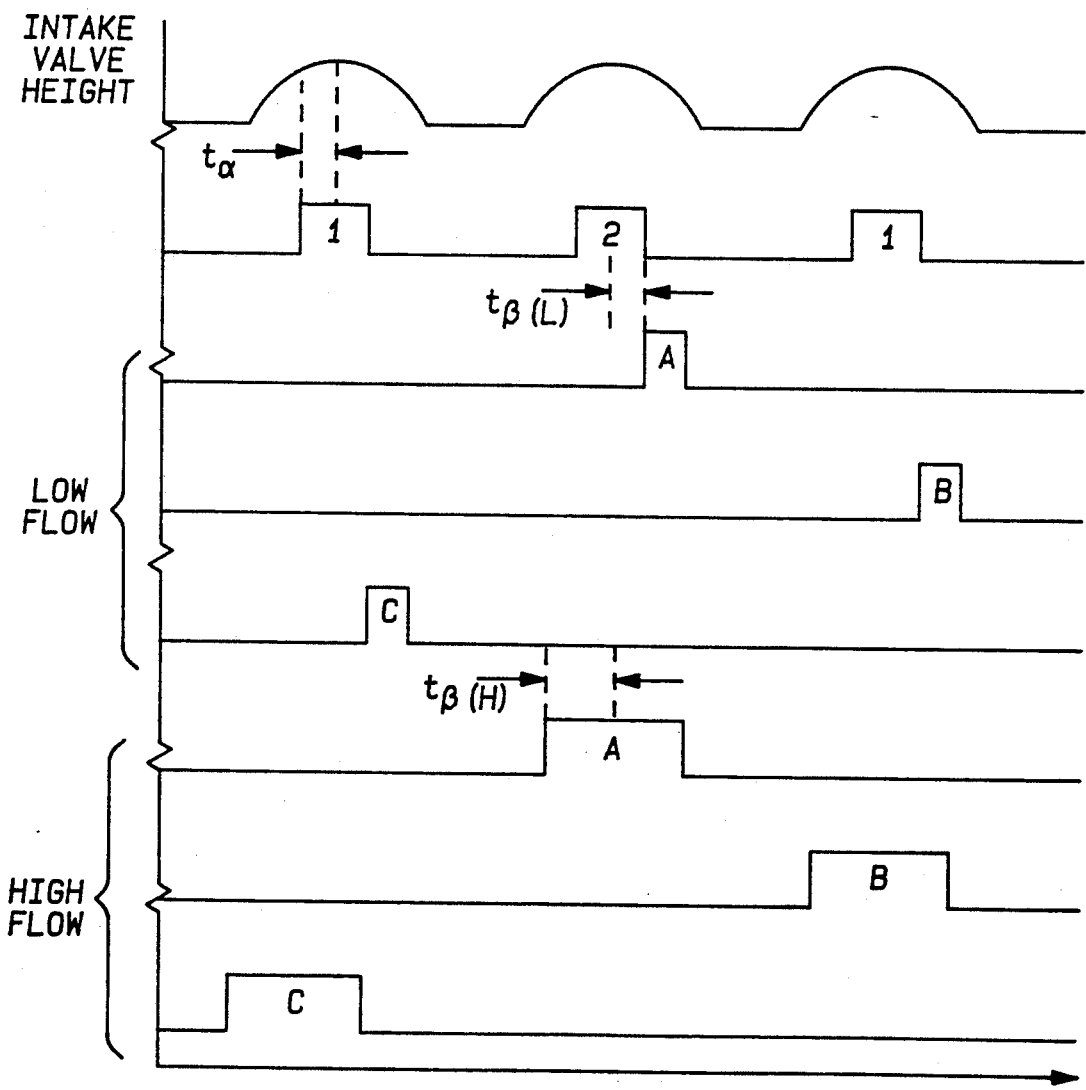
FIG. 10 is a graph of control signals to two conventional fuel injectors and three alternative fuel injectors at low and high flow rates.

Therefore $t_\beta$, the time before the given point in the valve opening event at which the alternative fuel injector is actuated, can be further set as a function of the incoming pulse width $PW_i$. The incoming pulse width $PW_i$ can be either the pulse width as generated by the ECM, or the duration of the final alternative fuel injector control signal $t_3$. As shown in FIG. 9, $t_\beta$ may have one value $t_{\beta(L)}$ at low flow rates, but have a relatively greater value $t_{\beta(H)}$, at higher flow rates when more energy is demanded by the engine. Although FIG. 9 shows $t_\beta$ as a kneed linear function of $PW_i$, it should be understood that $t_\beta$ may be any function of $PW_i$, including a straight linear function or a-curve. These values of $t_\beta$ can be stored for access by the translator software. As shown in FIG. 10, at the higher flow rates and corresponding greater values of $t_\beta$, the alternative fuel injectors may thereafter begin injecting the alternative fuel significantly earlier in the intake valve event than at lower flow rates.

It should be understood, of course, that while the forms of the invention herein shown and described constitute preferred embodiments of the invention, they are not intended to illustrate all possible forms thereof. It should also be understood that the words used are words of description rather than limitation and various changes may be made without departing from the spirit and scope of the invention disclosed.

What is claimed is:

1. A method of operating an internal combustion engine with an alternative fuel, the method comprising the steps of:

providing first and second alternative fuel injectors in fluid communication with the alternative fuel;

measuring the temperature of the alternative fuel;

generating an intermediate alternative fuel injector control signal in response to the temperature of the alternative fuel and the energy content differential of conventional fuel and the alternative fuel;

adjusting the intermediate alternative fuel injector control signal to a final alternative fuel injector control signal in accordance with the flow and operating characteristics of the alternative fuel injector; and transmitting the final alternative fuel injector control signal to the first alternative fuel injector until the load on the engine increases past the capacity of the first alternative fuel injector, and thereafter transmitting the final alternative fuel injector control signal to the first and second alternative fuel injectors.

2. A method of operating an internal combustion engine with an alternative fuel, the method comprising the steps of:

providing a plurality of alternative fuel injectors in fluid communication with the alternative fuel;

measuring the temperature of the alternative fuel;

generating an intermediate alternative fuel injector control signal in response to the temperature of the alternative fuel and the energy content differential of conventional fuel and the alternative fuel;

adjusting the intermediate alternative fuel injector control signal to a final alternative fuel injector control signal in accordance with the flow and operating characteristics of the alternative fuel injector; and synchronizing the final alternative fuel injector control signal among the alternative fuel injectors.

3. The method of claim 2 further including the step of varying the timing of the start of the final alternative fuel injector control signal as a function of the fuel flow rate demanded by the engine 4. A method of converting a conventionally fueled internal combustion engine to operate with an alternative fuel, the engine having an electronic control module which generates a control signal to a conventional fuel injector, the engine also having a valve which cycles through a valve opening event, the method comprising the steps of:

providing an alternative fuel injector in fluid communication with the alternative fuel;

measuring the temperature of the alternative fuel;

generating an intermediate alternative fuel injector control signal in response to the temperature of the alternative fuel and the energy content differential of conventional fuel and the alternative fuel;

adjusting the intermediate alternative fuel injector control signal to a final alternative fuel injector control signal in accordance with the flow and operating characteristics of the alternative fuel injector;

establishing the time ($t_\alpha$) between the control signal to the conventional fuel injector and a point of the valve opening event;

establishing the time ($t_\beta$) between the point of the valve opening event and the optimum point at which to actuate the alternative fuel injector;

adjusting the final alternative fuel injector control signal as a function of $t_\alpha$ and $t_\beta$; and transmitting the final alternative fuel injector control signal to the alternative fuel injector.

5. The method of claim 4 further including the step of adjusting the alternative fuel injector control signal as a function of the time ($t_{inj}$) between successive control signals generated by the electronic control module.

6. The method of claim 5 wherein the alternative fuel injector control signal is adjusted to begin at a time equal to $t_{inj}+t_\alpha-t_\beta$ after the first referenced control signal generated by the electronic control module.

7. The method of claim 5 wherein the alternative fuel injector control signal is adjusted to begin at a time equal to $(t_{inj}\div 3)+t_\alpha-t_\beta$ after the first referenced control signal generated by the electronic control module.

8. The method of claim 4 further including the step of varying the timing of the start of the final alternative fuel injector control signal as a function of the fuel flow rate demanded by the engine.

9. The method of claim 4 wherein the point of the valve opening event is the valve being fully open.

10. The method of claim 4 wherein the time ($t_\alpha$) is established by measurement.

11. The method of claim 4 wherein the time ($t_\beta$) is established by experiment.

12. The method of claim 4 wherein the alternative fuel injector is adapted for use as a port injector.

13. The method of claim 4 wherein the alternative fuel injector is adapted for use as a throttle body injector.

14. A method of converting a conventionally fueled internal combustion engine to operate with an alternative fuel, the engine having an electronic control module which generates a control signal to a conventional fuel injector, the method comprising the steps of:

providing a plurality of throttle body alternative fuel injectors in fluid communication with the alternative fuel;

measuring the temperature of the alternative fuel;

generating an intermediate alternative fuel injector control signal in response to the temperature of the alternative fuel and the energy content differential of conventional fuel and the alternative fuel;

adjusting the intermediate alternative fuel injector control signal to a final alternative fuel injector control signal in accordance with the flow and operating characteristics of the alternative fuel injector; and alternately transmitting the final alternative fuel injector control signal among the throttle body alternative fuel injectors.

15. The method of claim 14 further including the step of varying the timing of the start of the final alternative fuel injector control signal as a function of the fuel flow rate demanded by the engine.

16. A method of converting a conventionally fueled internal combustion engine to operate with an alternative fuel, the engine having an electronic control module which generates a control signal to a conventional fuel injector, the method comprising the steps of:

providing an alternative fuel injector in fluid communication with the alternative fuel;

measuring the temperature of the alternative fuel;

generating an intermediate alternative fuel injector control signal in response to the temperature of the alternative fuel and the energy content differential of conventional fuel and the alternative fuel;

adjusting the intermediate alternative fuel injector control signal to a final alternative fuel injector control signal in accordance with the flow and operating characteristics of the alternative fuel injector;

varying the timing of the start of the final alternative fuel injector control signal as a function of the fuel flow rate demanded by the engine; and transmitting the final alternative fuel injector control signal to the alternative fuel injector.

* * * * *